(12) United States Patent
Lim et al.

(10) Patent No.: US 7,720,445 B2
(45) Date of Patent: May 18, 2010

(54) MODULAR ACCESS POINT

(75) Inventors: Hui-Leng Lim, Newark, CA (US); Pat Wallace, San Jose, CA (US); Ed Geiger, San Martin, CA (US); Phil Ballai, San Jose, CA (US); Curt Croley, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1389 days.

(21) Appl. No.: 10/717,068

(22) Filed: Nov. 19, 2003

(65) Prior Publication Data

US 2005/0107136 A1 May 19, 2005

(51) Int. Cl.
*H04B 1/38* (2006.01)

(52) U.S. Cl. .............. 455/90.3; 455/550.1; 455/552.1; 379/110.01

(58) Field of Classification Search ............. 455/3.01, 455/41.2, 552.1, 550.1, 553.1, 11.1, 406, 455/90.3; 343/702, 718; 379/110.01
See application file for complete search history.

(56) References Cited

U.S. PATENT DOCUMENTS

| | | | | |
|---|---|---|---|---|
| 5,913,173 | A * | 6/1999 | Ohwaki et al. ............... | 455/557 |
| 6,259,929 | B1 * | 7/2001 | Kuisma .................... | 455/575.1 |
| 6,785,510 | B2 * | 8/2004 | Larsen ...................... | 455/11.1 |
| 6,847,330 | B2 * | 1/2005 | Rada et al. ................... | 343/702 |
| 2002/0118143 | A1 * | 8/2002 | Yokoshima et al. .......... | 343/895 |
| 2002/0172336 | A1 * | 11/2002 | Postma et al. .......... | 379/110.01 |
| 2002/0183038 | A1 * | 12/2002 | Comstock et al. ........... | 455/406 |
| 2003/0050032 | A1 * | 3/2003 | Masaki ....................... | 455/272 |
| 2003/0083097 | A1 * | 5/2003 | Kim ........................... | 455/553 |
| 2003/0104791 | A1 * | 6/2003 | Engstrom et al. ............. | 455/90 |
| 2004/0063456 | A1 * | 4/2004 | Griffin et al. ............. | 455/550.1 |
| 2004/0224646 | A1 * | 11/2004 | Bae ........................... | 455/90.3 |

* cited by examiner

*Primary Examiner*—Danh C. Le
(74) *Attorney, Agent, or Firm*—Fay Kaplun & Marcin, LLP (57) ABSTRACT

Described is a modular access point for wireless communications. The access point includes a housing which has at least one module receiving slot and a first wireless communication radio. The radio communicates with a first wireless device via a first frequency band. The access point also includes a removable module configured for insertion into the module receiving slot. The module includes a second communication radio utilizing a second frequency band so that, when the removable module is inserted into the slot, the access point is capable of communicating with a second wireless device via at least one of the first and second frequency bands. The access point includes a plurality of antenna connectors which are connected to the first and second radios. The access pint may utilize external antennas or internal antenna modules which interchangeably attachable to the antenna connectors.

22 Claims, 6 Drawing Sheets

MODULAR ACCESS POINT

BACKGROUND

The recent popularity of wireless local area networks ("WLANs") has resulted in massive research efforts aimed at optimizing the efficiency of such networks. One of the challenges of this research has been to maximize the functionality of hardware components of WLANs, while simultaneously conforming to specific industrial design requirements. Of particular interest is to provide a consumer with certain flexibility and allow to modify the appearance and functionality of WLAN components.

Recent developments have highlighted the desirability of dual-band functionality in WLANs. As more wireless devices (e.g., mobile computers, PDAS, and pagers, etc.) are being utilized in WLANs are capable of using either IEEE 802.11a, 802.11b or 802.11g standards, the utility of the WLAN which can operate at both the 2.4 Ghz (i.e., 802.11b/g) and the 5 GHz (i.e., 802.11a) frequency ranges increases. Therefore, WLAN hardware (e.g., access points ("APs")) needs to have dual-band functionality. This can be accomplished, for example, by using APs that are compliant with IEEE 802.11a and/or 802.11b/g. However, due to the many variables which factor into the adoption of a dual-band WLAN infrastructure, it is desirable to give the consumer the freedom to enable a single-band WLAN initially, and then add on a second band once it becomes practical and desirable to do so. Thus, it is likewise desirable to minimize the impact of these additional features on hardware components of the WLAN.

SUMMARY OF THE INVENTION

The present invention relates to a modular access point for wireless communications. The access point includes a housing which has at least one module receiving slot and a first wireless communication radio. The radio communicates with a first wireless device via a first frequency band.

The access point also includes a removable module configured for insertion into the module receiving slot. The module includes a second communication radio utilizing a second frequency band so that, when the removable module is inserted into the slot, the access point is capable of communicating with a second wireless device via at least one of the first and second frequency bands.

The access point includes a plurality of antenna connectors which are connected to the first and second radios. The access point may utilize external antennas or internal antenna modules which interchangeably attachable to the antenna connectors.

DETAILED DESCRIPTION

Figure 1:
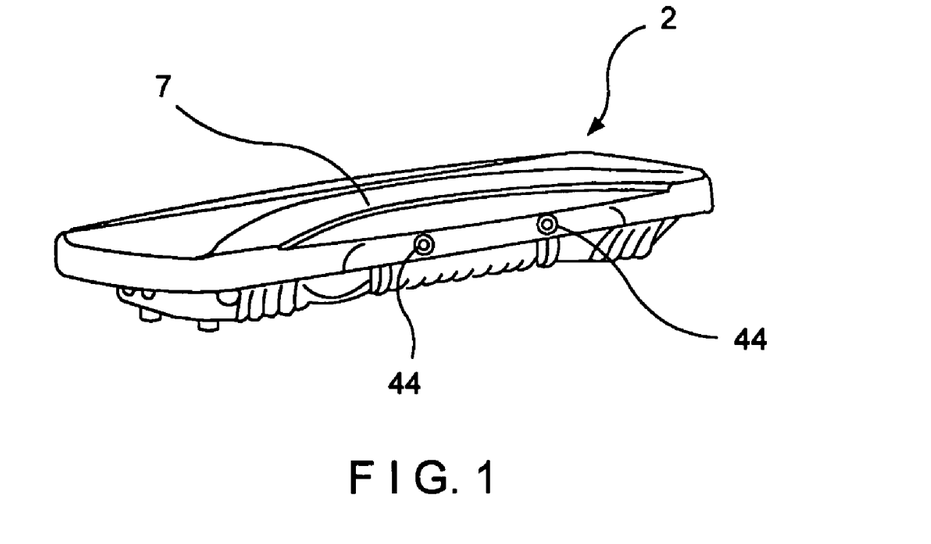
FIG. 1 shows a left side of an exemplary embodiment of a modular access point ("AP") according to the present invention.

FIG. 1 shows a modular wireless AP 2 which may be used for allowing various wireless computing devices (e.g., PCs, PDAs, etc.) to connected to a communication network (not shown). The AP 2 includes a conventional first wireless communication radio (not shown) which allows wireless communications via a first frequency band (e.g., IEEE 802.11a technology). The first radio is situated within a housing 7. In addition, there are two antenna connectors 44 that are utilized to attached internal or external antennas as described below. Furthermore, the AP 2 includes a microswitch (not shown) which is utilized to indicate whether the first radio is utilized the external or internal antennas.

Figure 2:
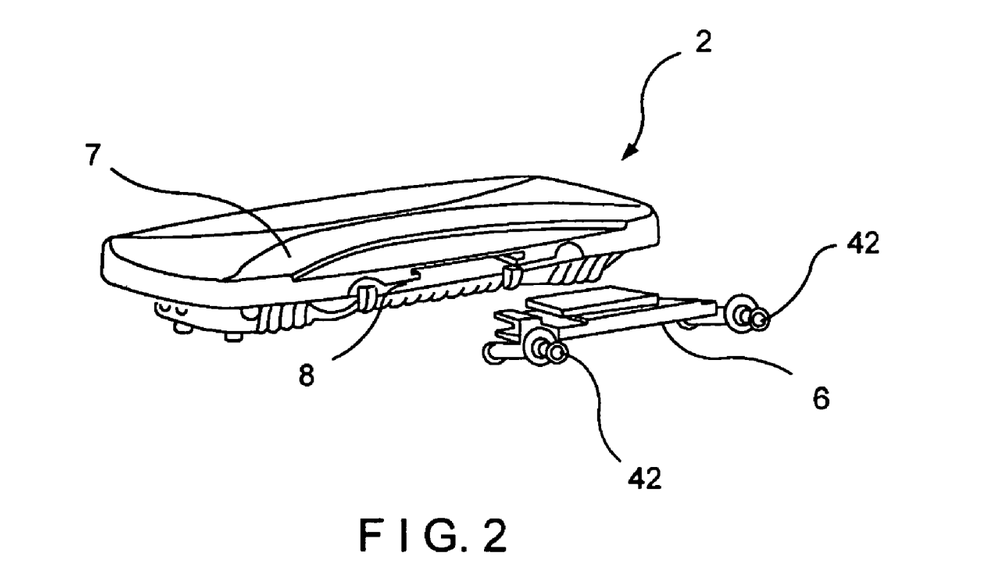
FIG. 2 shows a right side of the AP illustrated in FIG. 1 and a peripheral component module according to the present invention.

FIG. 2 shows an opposite side of the AP 2 illustrated in FIG. 1. The housing 7 includes a receiving slot 8 which may be covered with a removable side cover (not shown). The side cover may be made from the same material as the housing 7 (e.g., plastic, metal, etc.) so that it matches the appearance of the AP 2. The slot 8 may be utilized to insert a peripheral component module 6.

The peripheral module 6 is shown in a particular orientation relative to the AP 2 in which it is to be installed into the slot 8. The peripheral module 6 may be any peripheral device that is compatible with the hardware infrastructure of the AP 2. In one exemplary embodiment of the present invention, the peripheral module 6 may include a second wireless communication radio 20 (shown in FIGS. 3 & 4) allowing the AP 2 to communicate with other wireless devices via a second frequency band (e.g., using IEEE 802.11b/g technology). Thus, when the peripheral module 6 is assembled with the AP 2, the AP 2 is capable of communicating using the first and/or second frequency bands. Those skilled in the art would understand that the first frequency band may utilize the IEEE 802.11b/g technology, while the second frequency band may utilize the IEEE 802.11a technology.

Figure 3:
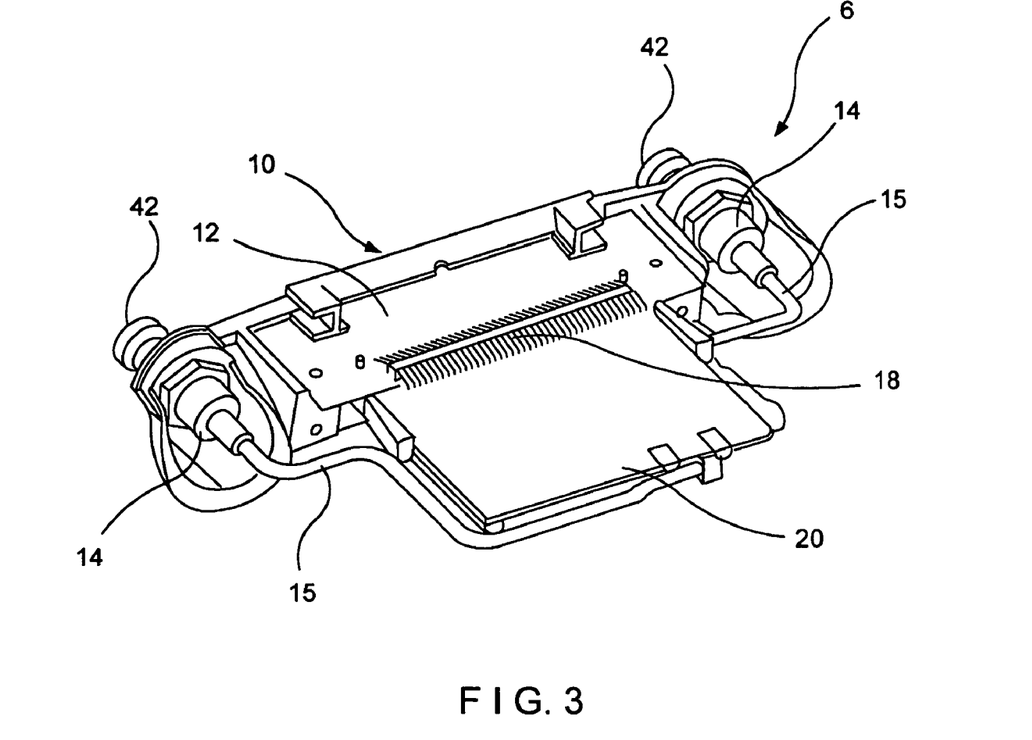
FIG. 3 shows another view of the peripheral component module shown in FIG. 2 according to the present invention.

FIG. 3 shows the peripheral module 6 which includes a further cover 10. The further cover 10 may be made of a material similar to the materials of the housing 7 so that when the peripheral module 6 is installed into the slot 8, the further cover 10 covers the slot 8 and matches the appearance of the AP 2.

The peripheral module 6 may also include circuitry that may be printed on an adapter printed circuit board ("PCB") 20, dual reverse connectors 14 and cable assemblies 15 that may be used to connect antenna(e) to the peripheral module 6. The cable connectors 14 may, e.g., be British Naval Connector ("BNC"), which is a type of a connector used with coaxial cables such as the RG-58 A/U cable used with the 10Base-2 Ethernet system. The basic BNC connector is usually a male-type connector that is mounted at each end of a cable. This connector has a center pin connected to the center cable conductor and a metal tube connected to the outer cable shield. A rotating ring, located outside the metal tube, locks the cable to any female connector.

Figure 4:
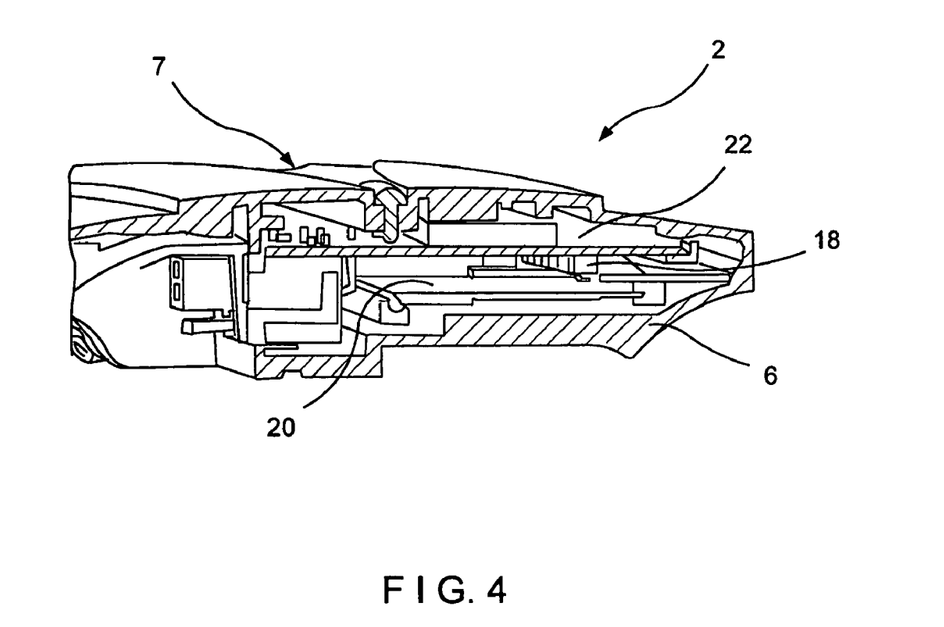
FIG. 4 shows a cross-sectional view of the AP assembled with the peripheral component module.

The peripheral module 6 may also contain a mini peripheral component interconnect ("PCI") connector 16 for connecting to the data bus of the AP 2. In addition, the peripheral module 6 may interface with a main PCB 22 of the AP 2 as shown in FIG. 4 via a main board interface connector 18.

The peripheral module 6 is connected to the AP 2 via a robust parallel mate connectors (i.e., the main PCB 22 and the interface connector 18). During the assembly of the peripheral module 6 with the AP 2, the interface connector 18 may establish a physical connection with a similar interface connector located on the PCB 22. The peripheral module 6 also include a pair of antenna connectors 42 which may be utilized for attaching internal or external antennas.

Figure 5:
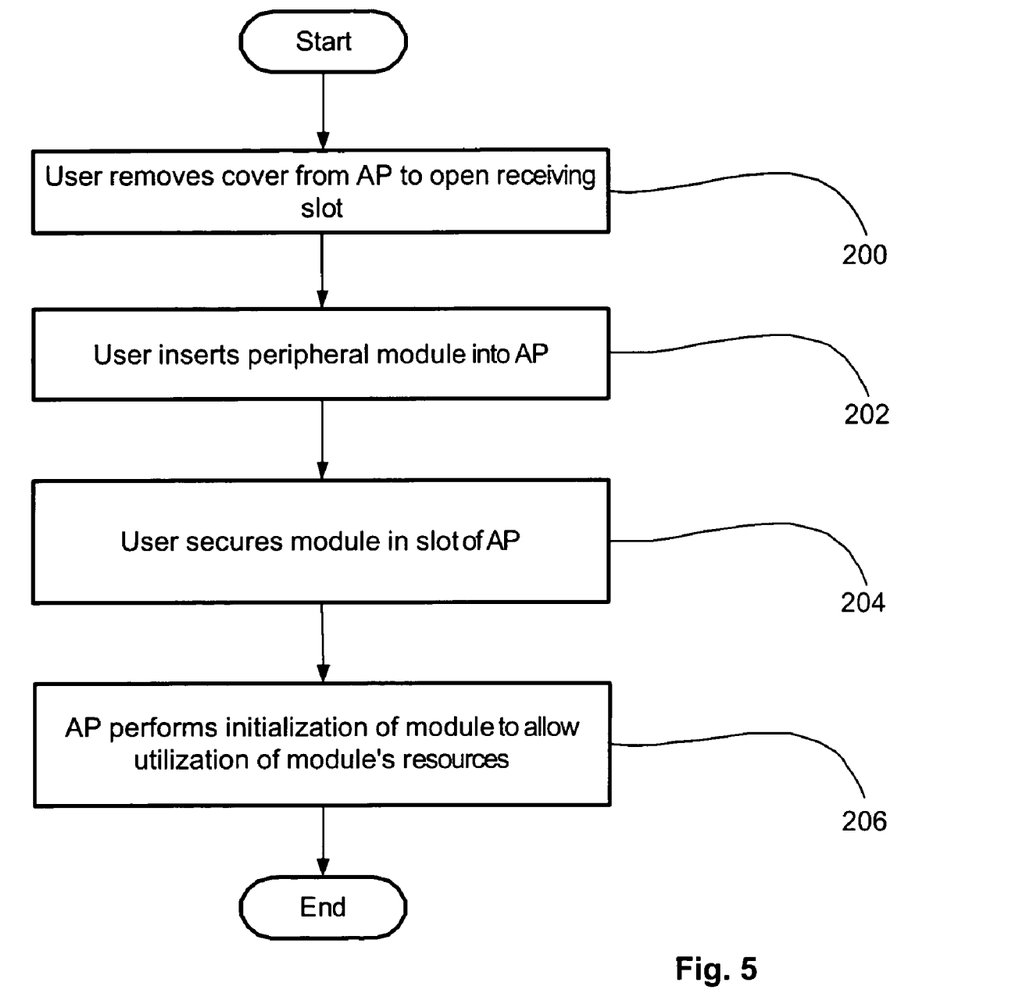
FIG. 5 shows an exemplary method for assembly of the AP with the peripheral component module.

FIG. 5 shows an exemplary method for user-assembly of the peripheral module 6 with the AP 2. The user may obtain the peripheral module 6 separately from the AP 2 (e.g., purchase the peripheral module 6 subsequent to the installation of the AP 2 into the WLAN). In step 200, the user removes the side cover from the side of the housing 7, thus opening the slot 8. The side cover may be attached to the AP 2 in a plurality of ways, for example, by using screws and/or male and female mating connectors to secure the side cover.

In step 202, the user then inserts the peripheral module 6 into the slot 8. The user also connects the main PCB 22 and the interface connector 18. In step 204, the user may then secure the module 6 to the AP 2 (e.g., using screws). In step 206, the AP 2 performs self-initialization test allowing the module 6 to be recognized and the resources of the module 6 be available for the user (e.g., the AP 2 may utilize the first and/or second frequency band).

Figure 6:
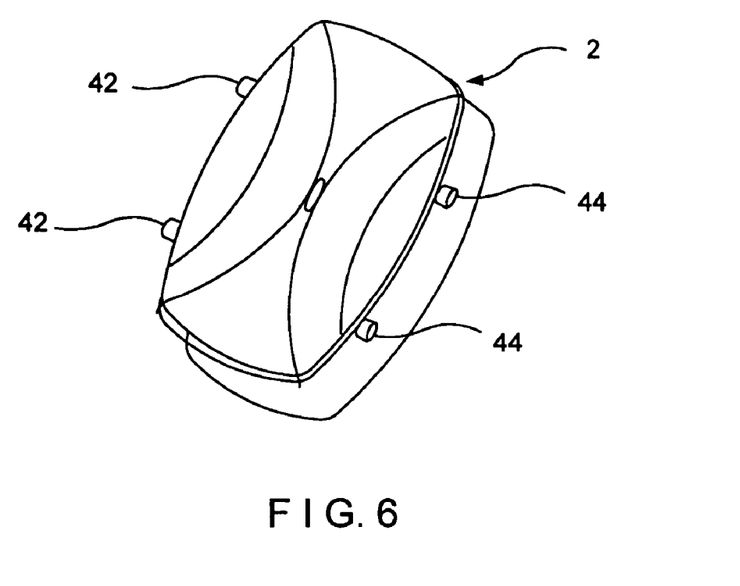
FIG. 6 shows the AP assembled with the peripheral module.
Figure 7:
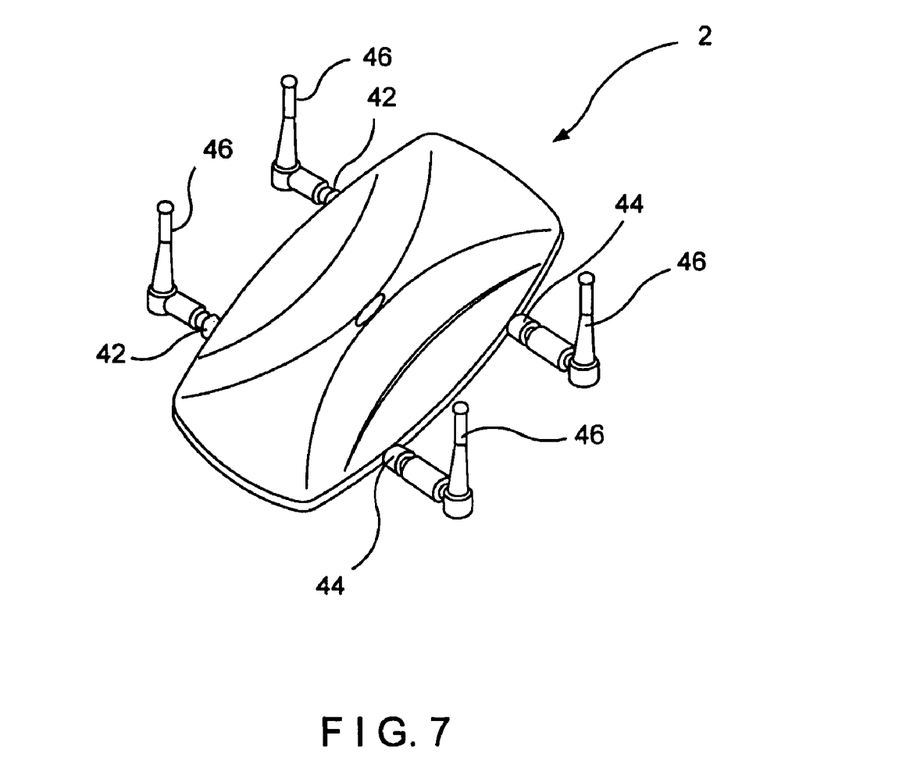
FIG. 7 shows the AP with "rubber duck" type external antennas.

FIG. 6 shows the AP 2 that includes the first and second radios capable of communicating via the first and/or second frequency bands. There are also two pairs of antenna connectors 42, 44 extending from the housing 7. These antenna connectors 42, 44 may be utilized for attachment of "rubber duck" type external antennas 46. The external antennas 46 are used with APs and generally the user of the WLAN installs them after the installation of the APs. Since the external antennas 46 are not installed by the manufacturer of the APs, the user may also remove them without much difficulty, which allows for their replacement with more efficient and aesthetically pleasing antennae.

Figure 8:
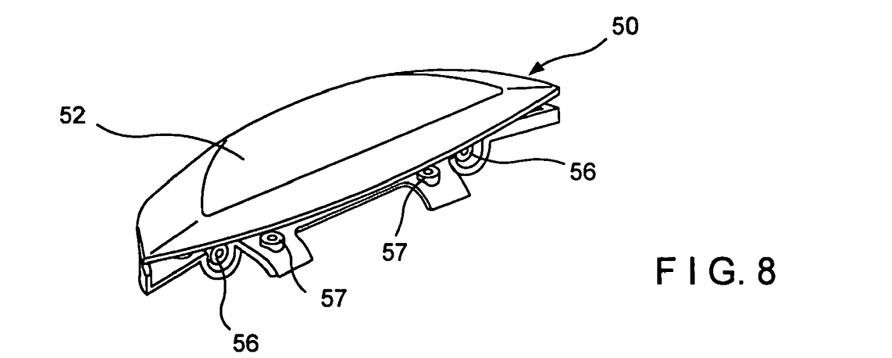
FIG. 8 shows an exemplary internal antenna module according to the present invention.
Figure 9:
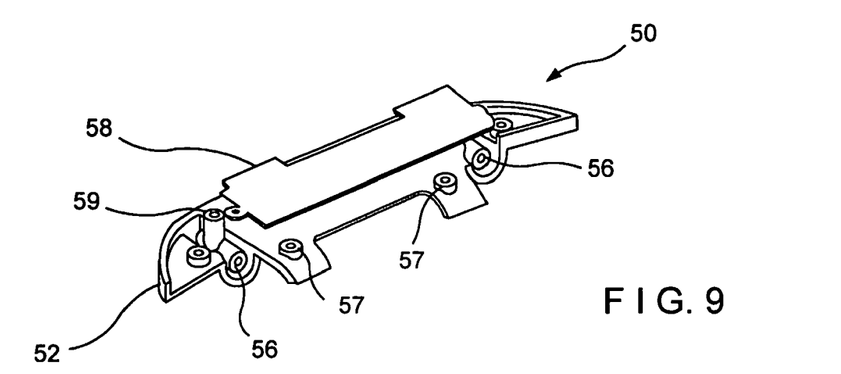
FIG. 9 shows components of the internal antenna module.

FIGS. 8 and 9 show an exemplary internal antenna module 50 according to the present invention. The internal antenna module 50 may include an internal antenna 58, a coaxial cable 59 and mating connectors 56 which are situated within a housing 52. The housing 52 may be manufactured from a plurality of materials (e.g., metal, plastic, etc.) that are similar to those of the housing 7. Exposed portions of the internal antenna module 50 are the mating connectors 56 and screw/bolt openings 57. The mating connectors 56 may be connected to the antenna connectors 42, 44. The openings 57 may be utilized for securing the integral antenna module 50 to the AP 2 using, e.g., screws or bolts. The internal antenna module 50 may be utilized with the first and second radios.

Figure 10:
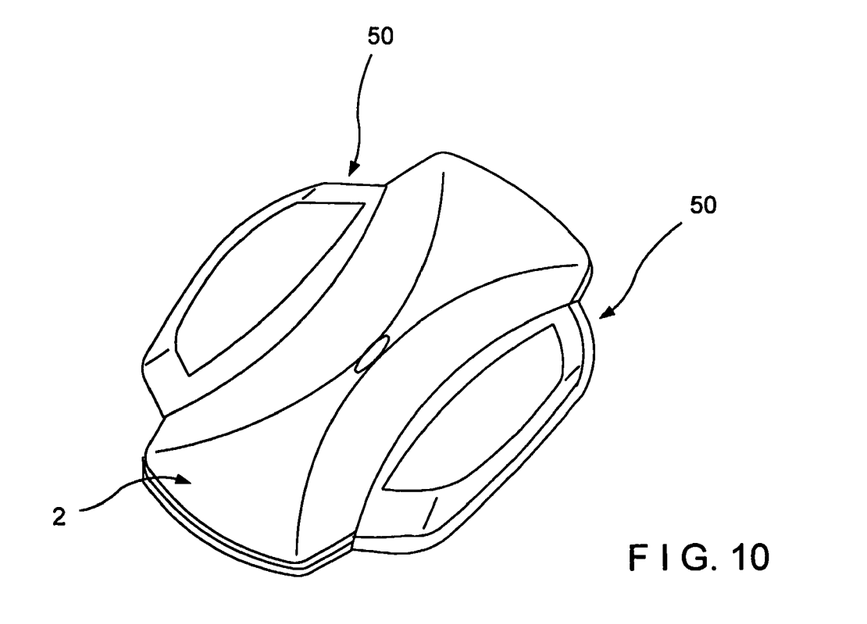
FIG. 10 shows the AP assembled with the internal antenna modules according to the present invention.
Figure 11:
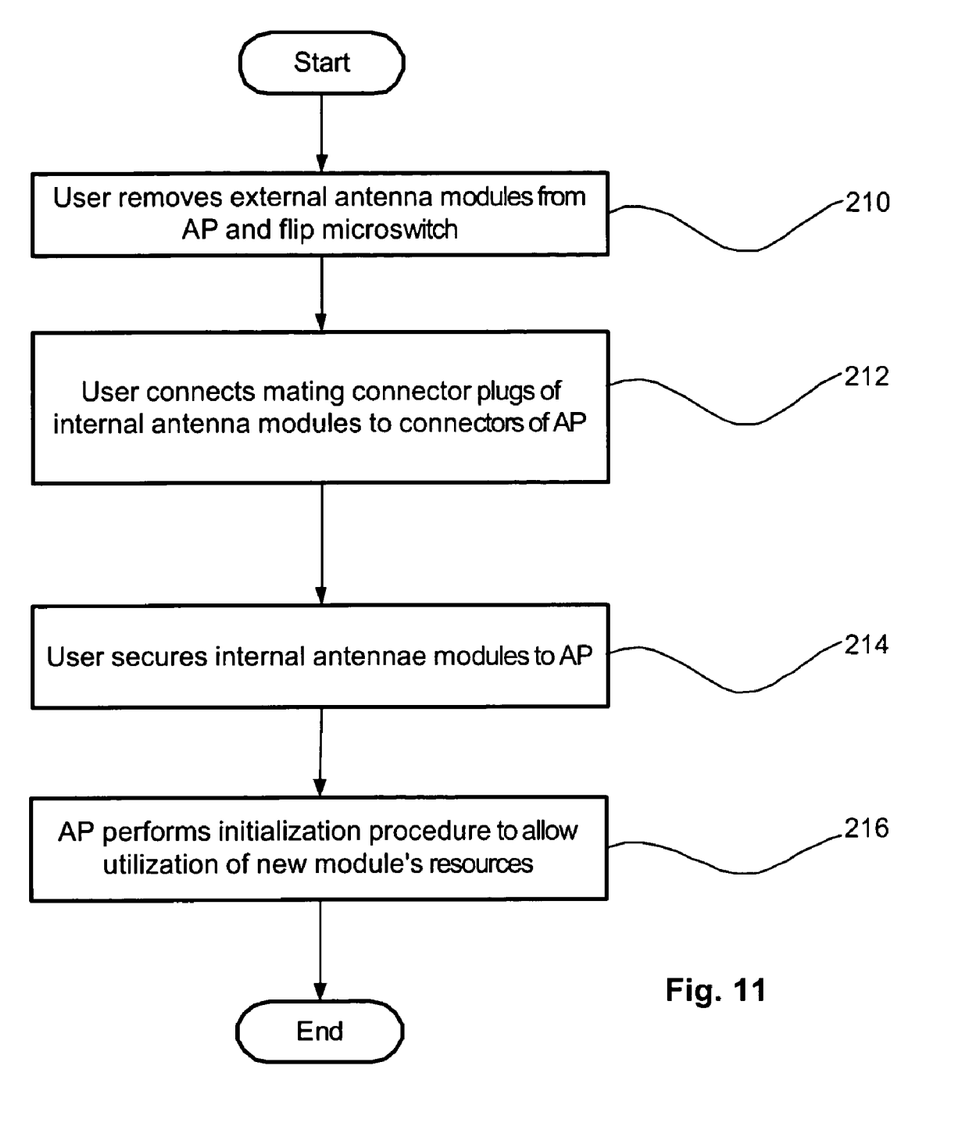
FIG. 11 shows an exemplary method for attaching at internal antenna modules to the AP.

FIG. 11 shows an exemplary method for the installation of the internal antenna module 50 into the AP 2. In addition, the microswitch is flipped to indicate that the internal antennas 58 are to be utilized. In step 210, as shown in FIG. 10, the user removes the external antennas 46 from the AP 2. In step 212, the user attaches the internal antenna modules 50 to the connectors 42, 44 (if both the first and second radios are present and utilized). In step 214, the user secures the internal antenna modules 50 to the AP 2 by using screws and the openings 57. In step 216, the AP 2 performs self-test to initialize the internal antenna modules 50 and prepare to utilize the internal antenna modules' resources.

The present invention permits the user of the WLAN to upgrade the existing hardware infrastructure without compromising the original physical design of the WLAN components (i.e., APs). In addition, a modular AP according to the present invention allows the WLAN user to install a single-band WLAN initially and if the need later arises, to expand to a dual-band WLAN by installing a peripheral component module. Thus, this option increases the utility of the WLAN hardware by allowing the user to upgrade the WLAN whenever necessary. Furthermore, the present invention precludes unnecessary investment in WLAN hardware that may not be initially needed (i.e., a dual-band capability).

The internal antenna modules 50 also provide another level of modularity to the present system. The user may add and/or replace antennae as is desired (i.e., technical or aesthetic reasons) without disrupting the general aesthetics of the existing WLAN components and their physical surroundings. The present invention provides the WLAN user with flexible infrastructure products that permit the user to choose or replace the antennae and other components of APs as desired.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. An access point for wireless communication, comprising:
   a housing including at least one module receiving slot and a first wireless communication radio, the first radio communicating with a first wireless device utilizing a first frequency band; and
   a removable module configured for insertion into the module receiving slot so that the removable module is disposed at least partially within the housing, the module including a second communication radio utilizing a second frequency band so that, when the removable module is inserted into the slot, the access point is capable of communicating with a second wireless device utilizing at least one of the first and second frequency bands.

2. The access point according to claim 1, wherein the housing include at least one cover covering the corresponding receiving slot and the removable module including a further cover which has a shape substantially similar to the shape of the cover, and wherein when the removable module is inserted into the slot, the cover is removed and the slot is covered with the further cover.

3. The access point according to claim 2, wherein the housing, the cover and the further cover are composed of substantially the same material.

4. The access point according to claim 1, wherein when communications over the first frequency band utilize 802.11a technology, communications over the second frequency band utilize one of 802.11b and 802.11g technology, and wherein when communications over the first frequency band utilize one of the 802.11b and 802.11g technology, communications over the second frequency band utilize the 802.11a technology.

5. The access point according to claim 1, wherein when the removable module is inserted into the slot, the second radio establishes an electrical connection with a circuitry of the housing.

6. The access point according to claim 5, wherein the second radio establishes the connection with the circuitry using a parallel connection.

7. The access point according to claim 1, further comprising:

a plurality of first antenna connectors connected to the first radio, wherein the module includes a plurality of the second antenna connectors connected to the second radio.

8. The access point according to claim 7, further comprising:

a plurality of external antennas; and at least internal antenna module including an internal antenna, wherein the external antenna and the at least one internal antenna module are connectable to the first and second radio using the first and second antenna connectors.

9. The access point according to claim 8, further comprising:

a switch indicating whether one of the external antenna and the internal antenna module is connect to the first and second antenna connectors.

10. The access point according to claim 1, wherein when the removable module is inserted into the slot, a circuitry of the housing performs an initialization procedure to initiate utilization, of resources of the removable module.

11. The access point according to claim 1, wherein the access point automatically forwards a communication from the first wireless device to at least one of the second wireless device and a third wireless device.

12. A wireless access point, comprising:

a first module including a first wireless communication radio communicating utilizing a first frequency band; and a housing including first and second receiving slots, the first module being mounted in a first receiving slot of the housing, the second receiving slot being capable of receiving a second removable module so that the second removable module is disposed at least partially within the housing, the second module including a second wireless radio communicating utilizing a second frequency band, wherein when the second module is inserted into the second slot, the access point is capable of communicating with a wireless device utilizing at least one of the first and second frequency bands.

13. The access point according to claim 12, wherein the first module is permanently mounted in the first slot.

14. The access point according to claim 12, wherein when communications over the first frequency band utilize 802.11a technology, communications over the second frequency band utilize one of 802.11b and 802.11g technology, and wherein when communications over the first frequency band utilize one of the 802.11b and 802.11g technology, communications over the second frequency band utilize the 802:11a technology.

15. The access point according to claim 12, further comprising:

a plurality of external antennas; and at least internal antenna module including an internal antenna, wherein the external antenna and the at least one internal antenna module are connectable to the first and second radio using the first and second antenna connectors.

16. The access point according to claim 15, further comprising:

a switch indicating whether one of the external antenna and the internal antenna module is connect to the first and second antenna connectors.

17. The wireless access point according to claim 12, wherein the wireless access point automatically forwards a communication from the first wireless radio to at least one of the second wireless radio and a third wireless device.

18. A wireless communication access point, comprising:

a first wireless radio communicating on a first frequency band;

a housing including at least one module receiving slot and housing the first radio; and at least one module selectively insertable into and removable from the slot so that the at least one module is disposed at least partially within the housing, the module including one of an internal antenna and an external antenna for the first radio, and a second wireless radio communicating on a second frequency band.

19. The access point according to claim 18, wherein the housing include at least one cover covering the corresponding receiving slot and the module including a further cover which has a shape substantially similar to the shape of the cover, and wherein when the module is inserted into the slot, the cover is removed and the slot is covered with the further cover.

20. The access point according to claim 18, wherein the first frequency band is an 802.11a and the second frequency band is one of 802.11b and 802.11g band.

21. The access point according to claim 18, wherein when the module is inserted into the slot, a circuitry of the housing performs an initialization procedure to initiate utilization of resources of the module.

22. The wireless communication access point according to claim 18, wherein the wireless communication access point automatically forwards a communication from the first wireless radio to at least one of the second wireless radio and a third wireless device.

* * * * *

UNITED STATES PATENT AND TRADEMARK OFFICE
CERTIFICATE OF CORRECTION

| | | |
|---|---|---|
| PATENT NO. | : 7,720,445 B2 | Page 1 of 1 |
| APPLICATION NO. | : 10/717068 | |
| DATED | : May 18, 2010 | |
| INVENTOR(S) | : Lim et al. | |

It is certified that error appears in the above-identified patent and that said Letters Patent is hereby corrected as shown below:

ON THE TITLE PAGE

Item (57), under "ABSTRACT", in Column 2, Line 13, delete "pint," and insert -- point --, therefor.

IN THE SPECIFICATION

In Column 1, Line 16, delete "PDAS," and insert -- PDAs, --, therefor.

IN THE CLAIMS

In Column 5, Line 22, in Claim 10, delete "utilization," and insert -- utilization --, therefor.

In Column 6, Line 2, in Claim 14, delete "802:11a" and insert -- 802.11a --, therefor.

In Column 6, Line 39, in Claim 20, delete "802:11a and" and insert -- 802.11a band and --, therefor.

Signed and Sealed this
Fifteenth Day of May, 2012

David J. Kappos
*Director of the United States Patent and Trademark Office*